3,419,072
CONSOLIDATION OF SUBTERRANEAN FORMATIONS
George P. Maly, Newport Beach, Gerould H. Smith, Santa Ana, George G. Bernard, Fullerton, and John R. Fox, Corona Del Mar, Calif., assignors to Union Oil Company of California, Los Angeles, Calif., a corporation of California
No Drawing. Filed Oct. 6, 1966, Ser. No. 584,660
24 Claims. (Cl. 166—33)

ABSTRACT OF THE DISCLOSURE

A method for consolidating incompetent clay-containing earth formations with a resin-forming material that is injected into the formation and then hardened by the action of a curing agent or catalyst subject to adsorption by the clay whereby adsorption of the catalyst is inhibited by first contacting the formation with a cationic surfactant prior to injection of the resin-forming material. The formation is preferably contacted with an amount of cationic surfactant sufficient to satisfy the ion-exchange capacity of the clay.

---

This invention relates generally to the treatment of incompetent subterranean formations, and for particularly, to an improved method for consolidating incompetent earth formations which have substantially high proportions of clay. Specifically, the invention provides a new and efficient process of treating unconsolidated earth masses with a hardenable resin to form a consolidated structure having high strength and retaining a substantial degree of porosity and permeability.

Recoverable fluids, such as petroleum oil, gas and water, are frequently found in subterranean formations comprising unconsolidated or loosely consolidated sand and sandstone. When such incompetent formations are pierced by a well bore and the connate fluids therein removed, the loose or weakly bound sand particles become dislodged and are entrained in the fluid. Some of the dislodged sand accumulates in the well bore and other flow areas causing plugging and reduced fluid flow, while other of the sand is carried to the surface with the withdrawn fluid. These entrained particles cause severe erosion of underground strainers and liners, the producing string, pressure control valves, pumps and flow lines. Substantial quantities of the entrained sand are deposited in field storage tanks causing cleaning and disposal problems. In extreme cases, sufficient sand can be removed from the producing formation to cause it to collapse under the overburden pressure, often causing damage to the well. Thus, fluid production from incompetent subterranean formations can result in restricted flow and increased production and well maintenance costs, unless the entrainment of sand from the formation can be controlled or completely eliminated.

Various sand control measures, including a number of consolidated methods, have been employed in an effort to contain incompetent sand within a producing formation. The consolidation of subterranean fluid producing formations with resin or plastic binders has been previously proposed. In general, the prior art resin consolidation methods comprise the injection of a resin-forming monomer or prepolymer, or a liquid solution of these materials, directly into the formation. These resin-forming materials are conventionally referred to in the well treating art as resins or plastics even though they have not been cured to a resinous state prior to injection. The resin monomer or prepolymer is then polymerized, or hardened, by the effect of temperature alone, or a curing agent can be admixed with the liquid resin or resin solution to catalyze the polymerization reaction. Alternatively, the curing agent can be separately injected as a second solution either preceding or following the injection of the resin.

One conventional plastic sand consolidation process comprises treatment of the incompetent sands with resins of the phenol-formaldehyde type. The resins of this type are formed by reacting formaldehyde or formalin with an aryl hydroxy compound, such as phenol or cresol, in the presence of a catalyst. Suitable catalysts comprise water soluble acids, or bases, or stannous chloride and an acid. Where the reactants are to be injected as the components of a solution, the phenol and the formaldehyde must be partially reacted to form an oil liquid phase in which the reactants, the partially cured resin and the catalyst are mutually soluble.

Another sand consolidation process finding wide acceptance comprises treatment of the formation with epoxy resins. The epoxy resins suitable for use in the epoxy consolidation process are well known, and are commercially available; a common class being the diglycidyl ethers of bisphenol A obtained by reacting epichlorohydrin with bisphenol A in the presence of caustic such as sodium hydroxide or potassium hydroxide. Generally, the epoxy resins are obtained as a mixture of monomeric epoxides and of polymeric polyepoxides. As is known in the art, by correlation of the proportions of epichlorohydrin, bisphenol A and caustic, the degree of polymerization can be controlled accordingly. Thus, increasing the epichlorohydrin to bisphenol A mol ratio generally results in a mixture of polyepoxide having a lower average molecular weight. On the other hand, increasing the mol ratio of sodium hydroxide to epichlorohydrin generally results in a mixture of higher average molecular weight. Also, as is known in the art, halohydrins other than epichlorohydrin, such as 1,2-dichloro-3-hydroxypropane and dichlorohydrin, can be used. Similarly, in place of bisphenol A there can be used mononuclear di- and tri-hydroxy phenols, such as resorcinal, hydroquinone, pyrocatechol, and phloroglucinol; polynuclear polyhydroxy phenols, such as 4,4'-dihydroxy diphenyl methane, trihydroxyl diphenyl dimethyl methane, and 4,4'-dihydroxy biphenyl. Other useful epoxy resins for sand consolidation include the condensation products of epichlorohydrin with polynuclear polyhydroxy phenols, also known as the epoxy novolac resins.

The epoxy resin is injected into the formation as a relatively low viscosity liquid, which can be diluted with a solvent is necessary, and then polymerized into a hardened mass by the action of temperature in the presence of a curing agent. A number of curing agents, or catalysts, are suggested in the art to harden the resin. These include amines, dibasic acids, and acid anhydrides. A preferred class of curing agents for use with epoxy resins are the amines, including primary, secondary, or tertiary amines and mixtures thereof. Exemplary of these agents are the primary amines, such as diethylene triamine, ethylene diamine, triethylene tetramine, dimethylamino propylamine, and diethylamino propylamine; cyclic aliphatic amines, such as piperidine, methane diamine; tertiary amines, aliphatic or aromatic substituted derivatives, such as triethylamine, benzyl dimethylamine, dimethylamino methyl phenol, tridimethyl amino methyl phenol and α-methylbenzyl dimethylamine; aromatic amines, such as metaxylylene diamine, 4,4'-methylene dianiline, and pyridine. As indicated, a mixture of the various amines is preferred. A mixture of primary and tertiary amines is even more preferred. This can be a physical mixture of two or more compounds, such as benzyl dimethylamine and diethylene triamine; or a single compound containing both primary and tertiary amine groups, as typified by dimethyl aminopropyl amine.

The problem of consolidating a sand by means of a plastic coating, such as the aforementioned phenol-formaldehyde and epoxy resins, is complicated and difficult. The majority of the sands are water wet and their pores contain droplets of oil surrounded by water which are in contact with the grains. The connate water in the sands is usually alkaline; and basic mineral materials, such as carbonates, often comprise a significant portion of whatever naturally occurring cementing materials exist between the grains of the sand. The unconsolidated sands are encountered at widely varying depths and exist at temperatures ranging from about 90° F. to 350° F. The variations in the depth of the sand, as well as the variations in the permeability, and the variations in size of tubing strings installed in the well interact to create wide variations in the time involved in pumping a liquid from a surface location into a sand encountered by the well.

Nevertheless, several commercial sand consolidation processes employing the aforementioned resin treatments have been developed which have enjoyed substantial success, particularly in clean sands, i.e., sands which contain little or no clay. However, these processes have not produced satisfactory treatments in formations having relatively high clay contents, such as those having clay contents above about 5 percent. Various clayey materials are highly adsorbent and preferentially adsorb the curing agents or catalysts from the resin catalyst mixtures, rendering them unavailable for catalysis of the injected resin. Insufficient catalyst results in the polymerization being wholly or partially incomplete, thereby weakening the consolidated structure sufficiently that sand production is at best only temporarily alleviated. Since many extensive petroleum reservoirs occur in incompetent formations having clay contents up to 40 percent, or higher, such as encountered in the Louisiana-Gulf Coast area, as well as elsewhere, present commercial consolidation processes are largely ineffective in producing satisfactory consolidation of these formations.

Accordingly, it is an object of the present invention to provide a resin consolidation process useful in consolidating an incompetent earth formation containing a high clay content. Another object is to provide a method for pre-treating high clay content earth formations so as to render them amenable to consolidation by resin treatment. Another object of the invention is to provide a method for forming permeable, high strength consolidated earth structures in incompetent formations containing adsorbent clayey materials in sufficient quantities to adversely affect the resin treatment. These and other objects of the invention will be apparent from the following detailed description thereof.

Briefly, the invention comprises a method for consolidating an incompetent earth formation containing a relatively high clay content with liquid resin injected into the formation and then hardened by the action of a curing agent or catalyst otherwise adsorbable by the clayey materials in the formation. Prior to the injection of resin or resin-catalyst mixtures into the earth formation, these clayey materials are rendered inert to the adsorbable catalysts by first treating the formation with a solution of cationic surfactant in sufficient quantity to satisfy the ion-exchange capacity of the clay. The cationic surfactant is adsorbed on the surfaces of the clay particles sufficiently to render the clay wholly or partially nonadsorbent for the subsequently injected catalyst. Thus, the catalyst remains in solution with the resin and is available for catalysis of the polymerization reaction. In a preferred embodiment of the invention, the earth formation in the consolidation zone is first treated with successive solvent injections to remove connate oil and water.

It has been unexpectedly found that by this special technique one can treat unconsolidated earth formations to convert them into consolidated masses having a high degree of porosity and the success of the treatment is not impaired by the presence of clay in proportions that impede consolidations by resin-forming materials applied by conventional technique. The above-described process is particularly suited for the treatment of formations surrounding injection wells or production wells for the recovery of petroleum from a petroleum reservoir. It may also be used in consolidating formations surrounding mine shafts or in consolidating earth formations for filtration purposes. Although any incompetent earth particles can be consolidated by the method of this invention, whether or not they contain clayey materials, the advantages of the process are realized when the formation to be consolidated has a sufficiently high content of adsorbent clay to adversely affect the resin curing reaction. Since various clays exhibit a greater or lesser adsorptivity, the extent of the resin degradation depends upon both the types and quantity of clay encountered. The method of this invention has been successfully demonstrated in consolidating earth particles which are substantially completely comprised of highly adsorbent clayey materials.

In the practice of this invention, a volume of nonaqueous cationic surfactant solution is first injected into the formation followed by subsequent injections of resin and/or catalyst, or resin-catalyst mixtures. The cationic surfactant should be selected so as to be readily adsorbed from the surfactant solution by the clay particles. To some extent, these surfactants will be adsorbed from the solution and bonded to the clay particles by hydrogen bonding between proton acceptor and donor groups, and particularly in the case of larger surfactant molecules by the effect of van der Waals forces of attraction between the surfactant molecules and the clay particles.

While cationic surfactants are adsorbed from the carrier solution in the foregoing manner, it is preferred that these surfactants be ionized so as to be adsorbed upon the molecule by ion-exchange. Thus, preferred surfactants for use in the practice of this invention are those materials which ionize under formation conditions to yield a surface active ion bearing a positive charge. This positively charged ion then becomes firmly bonded to the clay particle at an available negatively charged cation exchange site. Since the surfactant is only ionized in aqueous solution, it is necessary that sufficient water be available at the point of contact of the surfactant molecule with the clay particle to ionize the surfactant. However, excess water generally has an undesirable effect on the subsequent resin polymerization, and, accordingly, it is preferred that the formation be partially dehydrated prior to injection of the surfactant solution. In the usual case, the clay retains sufficient adsorbed water to ionize the surfactant, even after substantially complete dehydration by conventional techniques, as will be subsequently more fully described.

Cationic surfactants are generally amines or quaternary ammonium compounds. The amines are primary, secondary, and tertiary mono and diamines characterized by the following generalized formulas:

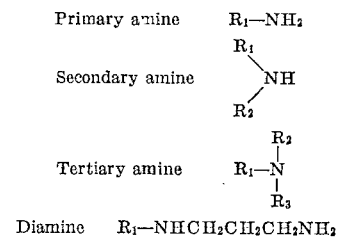

wherein $R_1$ is a relatively long chain alkyl group, and particularly a long chain alkyl group having from about 10 to about 20 carbon atoms; and wherein $R_2$ and $R_3$ are relatively short chain alkyl groups, and particularly alkyl groups having less than about 10 carbon atoms, and even more particularly, where $R_2$ and $R_3$ are methyl, ethyl, propyl and butyl groups.

The ethoxylated amines and particularly the polyethoxylated amines and diamines are cationic surfactants useful in the practice of this invention, and are characterized by the following generalized formulas:

Polyethoxylated amine 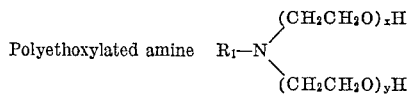

Polyethoxylated diamine 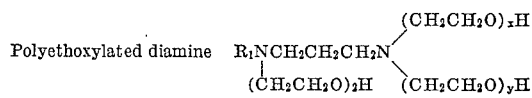

wherein $R_1$ is a relatively long chain alkyl group and $x$ and $y$ are integers from 2 to about 10.

While the foregoing amine-type cationic surfactants are useful in the practice of this invention under all formation conditions, as hereinabove disclosed, they are more advantageously employed in an acid environment as they are not ionized in any substantial amount in neutral and basic environments. Preferably the environment is adjusted to a pH value of less than about 6 by the injection of acid, and more preferably to a value of less than about 4.

The quaternary ammonium cationic surfactants are particularly preferred in the practice of this invention since they are ionized in aqueous media at all pH levels. Preferred quaternary ammonium compounds are quaternary ammonium salts and hydrates characterized by the generalized formula

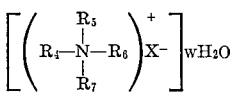

wherein $R_4$ is a relatively long chain organic group and $R_5$, $R_6$ and $R_7$ are relatively short chain organic groups of the same or different structures, X is a halogen and $w$ is zero or an integer.

Examples of specific commercially available quaternary ammonium compounds particularly useful in the practice of this invention are:

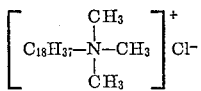

octadecyltrimethylammonium chloride

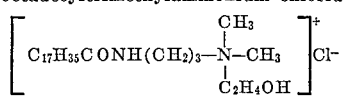

stearamidopropyl-β-hydroxyethyldimethylammonium chloride

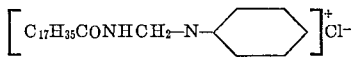

stearamidomethylpyridinium chloride

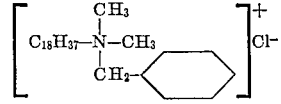

octadecyldimethylbenzylammonium chloride, and

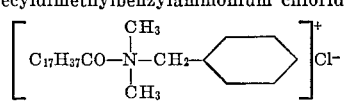

stearyldimethylbenzylammonium chloride

A particularly preferred quaternary ammonium salt for use in the practice of this invention is a n-alkyldimethylbenzylammonium chloride characterized by the following generalized formula

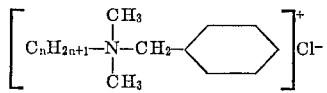

wherein $n$ is the integer 12, 14 or 16. Also preferred is a mixture of n-alkyldimethylbenzylammonium chlorides wherein the n-alkyl groups comprise $C_{12}$ hydrocarbons, $C_{14}$ hydrocarbons or $C_{16}$ hydrocarbons. A particularly preferred mixture of n-alkyldimethylbenzylammonium chloride comprises a mixture wherin the alkyl groups are about 40 percent $C_{12}$ hydrocarbons, 50 percent $C_{14}$ hydrocarbons and about 10 percent $C_{16}$ hydrocarbons. Accordingly, the preferred mixture comprises n-dodecyldimethylbenzylammonium chloride, n-tetradecyldimethylbenzylammonium chloride and n-hexadecyldimethylbenzylammonium chloride, and particularly mixtures comprising about 40 percent dodecyldimethylbenzylammonium chloride, about 50 percent tetradecyldimethylbenzylammonium chloride and about 10 percent n-hexadecyldimethylbenzyl ammonium chloride.

Quaternary ammonium monohydrates are also preferred. Typical of the preferred quaternary ammonium monohydrates are di-isobutylphenoxyethoxyethyldimethylammonium chloride, monohydrate having the following formula

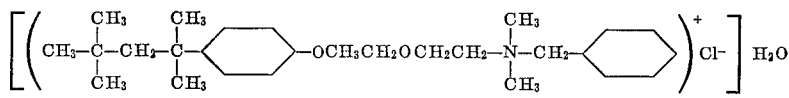

and di-isobutylcresoxyethoxyethyldimethylbenzylammonium chloride, monohydrate having the following formula:

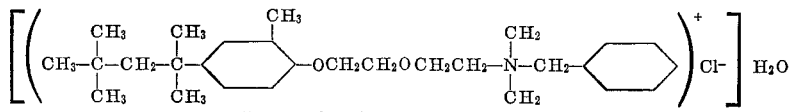

In treating incompetent subterranean earth formations according to our invention, any convenient method of injecting fluids into the zone to be consolidated can be utilized. The choice of injection techniques will depend primarily on the type and placement of subsurface casings, liners and tubing strings, the type of production equipment, the injection equipment available to the operator, and the experience of the operator. Conventionally, the zone to be treated is isolated by setting mechanical packers in the well bore above and below the consolidation zone. The vertical depth of formation to be consolidated can be controlled by the spacing between these packers. Generally, the zone to be treated can comprise a formation from about 2 to about 50 feet in vertical thickness, although it is preferred to treat a zone having a thickness of not more than 10 feet in a single injection step. Treatment of successive vertical layers of formation may be desirable in the case where a thick zone of incompetent sand is to be consolidated. Also, devices are available which permit the simultaneous injection of fluid into successive vertical layers under individually controlled conditions.

Because of the expense and time required to treat an incompetent formation, consolidation of only sufficient sand immediately adjacent the well bore to prevent displacement of the loose sand particles is preferred. Consolidation of the incompetent zone to a lateral distance of from about 1 to about 10 feet from the well bore is usually adequate; although, in any particular formation consolidation to a greater horizontal penetration can be advantageous. In most applications, consolidation to a horizontal distance of from about 3 to about 6 feet from the well is preferred. Although the preferred configuration of the consolidated zone can be defined as a cylinder symmetrically oriented about the well bore, because of differences in permeability, and because of differences in the vertical and horizontal injectivity profile, and due to the effect of hydrostatic head, the actual consolidated zone will be somewhat irregular in shape. The assumption that the consolidated zone is a regular cylinder having a height equal to the desired depth of penetration is sufficiently accurate for computation of the required treating volumes, etc. The volume of fluid required to fill the consolidation zone is the pore or interstitial volume defined by this cylinder.

It is preferred in the practice of this invention to treat a clay-containing formation with sufficient of the aforesaid cationic surfactants to satisfy the ion-exchange capacity of the clay. That is, each of the anionic, or electronegative, sites of the clay will be combined with a positively charged cationic surfactant ion. While the stoichiometric quantity of surfactant can be approximated by analysis of core samples and by knowledge of the characteristics of similar clay structures, it is preferred to employ an excess of cationic surfactant to assure that the ion-exchange capacity of the clay is satisfied.

When the unconsolidated mass contains connate water, i.e., liquid water adhering to the earth particles due to capillary forces, and/or hydrocarbons such as oil, as is usually the case with petroleum sands, it is generally desirable to first remove such connate water and hydrocarbons before contacting the mass with the resin-catalyst mixture. A preferred technique for removing the water includes treatment of the mass with water removing fluids, such as for example oxygenated hydrocarbon compounds having at least one keto-oxygen and/or hydroxyl group. Examples of such materials include, among others, isopropyl alcohol, n-propyl alcohol, secondary butyl alcohol, acetone, methylethyl ketone and the like, and mixtures thereof. One particularly preferred oxygenated hydrocarbon is isopropyl alcohol. Usually the water and oil are adequately removed by the injection of a water and oil miscible liquid such as a lower alcohol, but in some cases, it is desirable to precede the alcohol slug with a slug of liquid hydrocarbon such as diesel.

The cationic surfactant can be added to a final portion of the water removing oxygenated compound injected into the formation, or alternatively, can be injected as a separate liquid slug. Where separate injection is desired, it is usually advantageous to inject the cationic surfactant as a liquid solution in a suitable non-aqueous solvent, such as one of the aforementioned oxygenated hydrocarbon compounds.

Further, it has been discovered that superior results are obtained when the cationic surfactant solution is followed immediately with an additional quantity of oxygenated hydrocarbon compound prior to injection of the resin-forming material.

Recommended practice with some of the commercially available consolidation plastics includes pretreatment of the formation with an aromatic solvent immediately prior to the resin injection. Accordingly, where desired, the method of this invention includes the optional step of contacting the formation particles with an aromatic solvent after treatment with the cationic surfactant or the subsequently injected oxygenated hydrocarbon compound and prior to injection of the resin.

Thus, a preferred mode of practicing the method of this invention for consolidating incompetent petroleum bearing earth formations comprises (1) the injection of a quantity of diesel through said well bore and into said formation; (2) next injecting a quantity of an oxygenated hydrocarbon liquid; (3) admixing a cationic surfactant into a final portion of the oxygenated hydrocarbon liquid; (4) following the surfactant injection with an additional quantity of oxygenated hydrocarbon liquid; (5) injecting a quantity of aromatic solvent; (6) injecting the resin-forming material; and (7) displacing these fluids from the well bore and into the formation. The well is then maintained shutin for sufficient time to permit curing of the resin, whereupon production can be resumed in conventional manner. The specific quantities of wash solution employed are a matter of choice depending upon the particular application, but usually the volume of the diesel and oxygenated hydrocarbon solvent washes is between about 1.0 and about 5.0 pore volumes, with a lesser amount of oxygenated hydrocarbon afterflush being preferred, and usually less than about 1.0 pore volume.

In practicing this invention it is often convenient to prepare a cationic surfactant concentrate prior to the consolidation operation which can be added to the injected fluid at the time of injection. Such concentrate compositions are within the scope of this invention and comprise a cationic surfactant dissolved in a nonaqueous solvent. A particularly preferred composition comprises a mixed n-alkyldimethylbenzylammonium chloride as defined above dissolved in a small quantity of an oxygenated hydrocarbon solvent. One particular example of such composition comprises in admixture about 17 parts of mixed n-alkyldimethylbenzylammonium chloride dissolved in about 2 parts of isopropyl alcohol.

The improved consolidation method of this invention is demonstrated by the following examples which are presented by way of illustration, and are not intended as limiting the spirit and scope of the invention as defined by the appended claims.

EXAMPLE 1

The consolidation of a clayey material material with epoxy resin according to the method of this invention is demonstrated by the following test. Approximately 200 grams of montmorillonite clay is admixed with 400 grams of formation brine so as to form a thick paste. Eight 30 gram portions of this clay mixture are placed in individual closed containers. Varying quantities of Hyamine 3500, a proprietary cationic surfactant comprising n-alkyl-dimethylbenzylammonium chloride marketed by the Rohm and Haas Company, are admixed with seven of the clay samples and allowed to stand for 10 minutes at 160° F. Next, the clay samples are individually consolidated with 10 grams of Epon 828 resin mixture, a proprietary resin of the Shell Chemical Company. The resin comprises a mixture of 100 parts by weight resin and 46 parts by weight Laromin C–260 catalyst. The individual clay-resin mixtures are cured or about 1 hour at 160° F. and then inspected for hardness. The samples containing in excess of 0.15 parts of cationic surfactant per part of clay are consolidated into a hard mass, thus demonstrating the operability of the method in consolidating earth particles, even where the earth particles are comprised entirely of clay. The results of the foregoing test are illustrated in Table 1.

Table 1.—Consolidation of Montmorillonite clay

Cationic surfactant added, grams/gram of clay:

| | Degree of consolidation |
|---|---|
| 0 | Unconsolidated. |
| 0.05 | Crumbly, some consolidation. |
| 0.10 | Firm. |
| 0.15 | Hard. |
| 0.20 | Do. |
| 0.25 | Do. |
| 0.30 | Do. |
| 0.35 | Do. |

EXAMPLE 2

Consolidation of a sand containing a relatively high proportion of clay is demonstrated as follows. A mixture of 55 parts by weight of crystal silica No. 38, 5 parts by weight of portland cement, 7 parts by weight of formation brine, and 40 parts by weight of montmorillonite clay is prepared and mixed. This mixture is dried, pulverized and passed through a 40 mesh screen. The fine, solid particulate mixture is then packed into a glass tube having a diameter of 1 inch and a length of 3 inches and saturated with formation brine. The following liquids are successively passed through the packed tube with the aid of a slight vacuum pulled on the effluent end of the tube:

(1) 100 cc. of diesel,
(2) 100 cc. of 99% isopropyl alcohol,
(3) 50 cc. of a mixture of 34 parts of 99% isopropyl alcohol and 6 parts of Hyamine 3500, a proprietary cationic surfactant comprising n-alkyldimethylbenzylammonium chloride marketed by the Rohm and Haas Company,
(4) 35 cc. of a mixture of equal parts diesel and xylene, and
(5) 35 cc. of Eposand 9, a propritary epoxy resin-catalyst-accelerator mixture marketed by the Shell Chemical Company.

Following the resin treatment, the sand pack is sealed in a glass jar and cured for 24 hours at 220° F. After curing, the glass tube is broken away from the sand and the sand observed to be consolidated into a hard porous mass.

EXAMPLE 3

The consolidation of a clayey subterranean formation is demonstrated by the following core test. Six cylindrical tubes of porous filter paper are prepared, each cylinder having a uniform diameter between about 9/16 inch and 3/4 inch and a length of 3¾ inches. The largest diameter of these tubes is concentrically positioned in a conventional Hassler sleeve and the annular area between the sleeve and the tube filled with Nevada 130 sand. The tube next smaller in diameter is concentrically positioned in the sleeve and the annular area between the two tubes is filled with a mixture of 100 parts by weight montmorillonite clay and 200 parts by weight of fine Nevada sand. This procedure is repeated until all six tubes have been positioned within the Hassler sleeve and the center core filled with clay mix. The core is capped with an aloxite disc and the Hassler sleeve closed. A pressure of 1000 p.s.i.g. is then placed on the sleeve representative of an overburden pressure of this magnitude and the core saturated with formation brine. The brine is then displaced with 200 cc. of diesel. The core prepared by this technique simulates stratified, oil-saturated, clay-sand formations typical of many oil formations.

Consolidation of the incompetent core is accomplished by passing fluids through the core while maintaining a pressure of 1000 p.s.i.g. on the sleeve, as follows:

(1) 80 cc. of 99% isopropyl alcohol,
(2) 40 cc. of a mixture of 34 parts of 99% isopropyl alcohol and 6 parts of Hyamine 3500, a cationic surfactant comprising n-alkyldimethylbenzylammonium chloride marketed by the Rohm and Haas Company,
(3) 40 cc. of 99% isopropyl alcohol,
(4) 35 cc. of xylene, and
(5) 35 cc. of Eposand 9, a proprietary epoxy resin-catalyst-accelerator mixture marketed by the Shell Chemical Company.

The treated core is cured at 140° F. prior to removal from the core. The resulting core comprises a hard, consolidated mass having substantial permeability.

EXAMPLE 4

A commercial well completed in an incompetent sand formation is consolidated according to the method of this invention. This well had a history of sand entrainment resulting in the abandonment of the well because of inability to maintain economical production. Prior consolidation treatments failed to control the loose sand.

The well is bailed to remove sand deposits and treated by injecting the following fluids through the well bore and into the formation:

(1) approximately 3.0 pore volumes of diesel,
(2) approximately 3.0 pore volumes of isopropyl alcohol having a cationic surfactant treating mixture added to the final portion of this injection,
(3) approximately 0.2 to 0.4 pore volume of isopropyl alcohol,
(4) approximately 1.0 pore volume of aromatic solvent,
(5) approximately 1.0 pore volume of Eposand 9, a proprietary epoxy resin-catalyst-accelerator mixture marketed by the Shell Chemical Company and prepared at the surface, and
(6) a volume of diesel sufficient to displace the resin mixture from the tubing.

The well was blocked in for 8 hours to permit curing of the resin and then after 24 hours returned to production. Following the aforedescribed consolidation, the well produced sand-free oil at allowable rates.

The cationic surfactant treating mixture used to pretreat the formation prior to resin injection comprises a liquid solution of 17 parts by volume of Hyamine 3500, a proprietary cationic surfactant comprising n-alkyldimethylbenzylammonium chloride marketed by the Rohm and Haas Company and 2 parts isopropyl alcohol.

While particular embodiments of the invention have been described, it will be understood, of course, that the invention is not limited thereto since many modifications can be made and it is intended to include within the invention any such modifications as fall within the scope of the claims.

The invention having thus been described, we claim:

1. A method for consolidating incompetent earth formations containing clayey constituents, which comprises:
   contacting said earth formation with a cationic surfactant that is adsorbed by the clayey constituents of the formation in an amount sufficient to inhibit the adsorption of subsequently injected polymerization catalyst;
   thereafter contacting said earth formation with a hardenable, resin-forming material and with a polymerization catalyst that promotes the hardening of the resin-forming material and that is subject to adsorption by the clayey constituents of the formation; and
   curing said resin-forming material to obtain a consolidated mass of earth particles.

2. The method defined in claim 1 wherein said cationic surfactant is injected in nonaqueous solution.

3. The method defined in claim 1 wherein an amount of said cationic surfactant is injected into said formation in excess of the amount required to satisfy the ion-exchange capacity of earth particles in the zone of said formation to be consolidated.

4. The method defined in claim 1 wherein said cationic surfactant is an amine and wherein the pH of said formation is adjusted to a value below about 4.

5. The method defined in claim 1 wherein said cationic surfactant is a quaternary ammonium compound.

6. The method defined in claim 1 wherein said cationic surfactant is a quaternary ammonium salt.

7. The method defined in claim 6 wherein said quaternary ammonium salt is a n-alkyldimethylammonium chloride characterized by the following generalized formula:

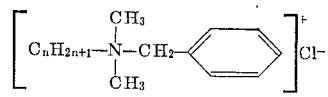

wherein $n$ is the integer 12, 14 or 16.

8. The method defined in claim 6 wherein said quaternary ammonium salt is a mixture n-dodecyldimethylbenzylammonium chloride, n-tetradecyldimethylbenzylammonium chloride, n-hexadecyldimethylbenzylammonium chloride.

9. The method defined in claim 8 wherein said mixture comprises about 40 percent n-dodecyldimethylbenzylammonium chloride, about 50 percent n-tetradecyldimethylbenzylammonium chloride and about 10 percent n-hexadecyldimethylbenzylammonium chloride.

10. A method for consolidating incompetent clay-containing subterranean formations penetrated by a well, which comprises:
    injecting a quaternary ammonium compound through said well and into said formation in an amount in excess of the amount required to satisfy the ion-exchange capacity of the earth particles in the zone of said formation to be consolidated;
    thereafter injecting into said formation a hardenable, resin-forming material and a polymerization catalyst that promotes the hardening of said resin-forming material and that is subject to adsorption by earth particles in the formation, the adsorption of said catalyst by said formation being inhibited by the prior injection of said quaternary ammonium compound; and
    curing said resin-forming material to obtain a consolidated mass of earth particles.

11. The method defined in claim 10 wherein said quaternary ammonium compound is injected in nonaqueous solution.

12. The method defined in claim 10 wherein said quaternary ammonium compound is a quaternary ammonium salt.

13. The method defined in claim 12 wherein said quaternary ammonium salt is a n-alkyldimethylammonium chloride characterized by the following generalized formula:

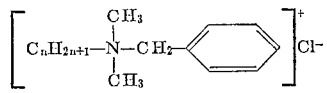

wherein $n$ is the integer 12, 14 or 16.

14. The method defined in claim 12 wherein said quaternary ammonium salt is a mixture n-dodecyldimethylbenzylammonium chloride, n-tetradecyldimethylbenzylammonium chloride, n-hexadecyldimethylbenzylammonium chloride.

15. The method defined in claim 14 wherein said mixture comprises about 40 percent n-dodecyldimethylbenzylammonium chloride, about 50 percent n-tetradecyldimethylbenzylammonium chloride and about 10 percent n-hexadecyldimethylbenzylammonium chloride.

16. The method defined in claim 10 wherein said formation is contacted with a water-removing solvent prior to injection of said quaternary ammonium compound.

17. In the method of consolidating incompetent clay-containing earth formations with a resin-forming material wherein the hardening of the resin is promoted by a polymerization catalyst subject to adsorption from the resin-forming mixture by the clay, the improvement which comprises contacting said formation with a nonaqueous solution of cationic surfactant prior to contacting said formation with said resin-forming material so as to coat said clay particles with said cationic surfactant, thereby inhibiting the adsorption of said catalyst by said clay.

18. A method for consolidating incompetent petroleum-bearing clay-containing formations penetrated by a well through which said petroleum is withdrawn, which comprises:
    sequentially injecting the following fluids into said well,
    (1) a volume of liquid hydrocarbon,
    (2) a volume of oxygenated organic solvent,
    (3) a nonaqueous solution of quaternary ammonium compound containing an amount of said quaternary ammonium compound in excess of the amount required to satisfy the ion exchange capacity of earth particles in the zone to be consolidated,
    (4) an additional volume of oxygenated organic solvent,
    (5) a volume of liquid resin-forming material containing a catalyst to promote the polymerization of said resin-forming material, said catalyst being adsorbed by clay, and
    (6) a volume of inert liquid sufficient to displace the other of said fluids into said formation;
    closing said well to permit said resin-forming material to harden; and
    producing petroleum from said formation through said well.

19. The method defined in claim 18 wherein said resin-forming material is epoxy resin.

20. The method defined in claim 18 wherein said oxygenated organic solvent is isopropyl alcohol.

21. The method defined in claim 18 wherein said quaternary ammonium compound is a quaternary ammonium salt.

22. The method defined in claim 18 wherein said quaternary ammonium salt is a n-alkyldimethylammonium chloride characterized by the following generalized formula:

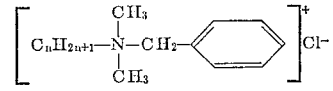

wherein $n$ is the integer 12, 14 or 16.

23. The method defined in claim 18 wherein said quaternary ammonium salt is a mixture n-dodecyldimethylbenzylammonium chloride, n-tetradecyldimethylbenzylammonium chloride, n-hexadecyldimethylbenzylammonium chloride.

24. The method defined in claim 23 wherein said mixture comprises about 40 percent n-dodecyldimethylbenzylammonium chloride, about 50 percent n-tetradecyldimethylbenzylammonium chloride and about 10 percent n-hexadecyldimethylbenzylammonium chloride.

References Cited

UNITED STATES PATENTS

| | | | |
|---|---|---|---|
| 3,047,067 | 7/1962 | Williams et al. | 166—33 |
| 3,097,692 | 7/1963 | Holland et al. | 166—33 |
| 3,123,138 | 3/1964 | Robichaux | 166—33 |
| 3,176,767 | 4/1965 | Brandt et al. | 166—33 |
| 3,291,214 | 12/1966 | Hower | 166—33 |
| 3,294,168 | 12/1966 | Bezemer et al. | 166—33 |
| 3,339,633 | 9/1967 | Richardson | 166—33 |

STEPHEN J. NOVOSAD, *Primary Examiner.*